Dec. 17, 1929.  J. H. WAGENHORST  1,739,878
VEHICLE WHEEL
Filed April 2, 1927  2 Sheets-Sheet 1

INVENTOR.
J.H.Wagenhorst
BY
his ATTORNEYS

INVENTOR.
J. H. Wagenhorst

Patented Dec. 17, 1929

1,739,878

UNITED STATES PATENT OFFICE

JAMES H. WAGENHORST, OF JACKSON, MICHIGAN

VEHICLE WHEEL

Original application filed July 17, 1924, Serial No. 726,529. Divided and this application filed April 2, 1927. Serial No. 180,478.

My present invention relates to vehicle wheels, and has to do, more particularly, with the construction of wheels intended for use upon automobiles and for carrying a resilient tire, preferably, of the pneumatic type. This application is a division of my co-pending application for Letters Patent for improvements in vehicle wheels, Serial No. 726,529, filed July 17th, 1924.

The widespread use of balloon tires, or tires of larger cross-section than those heretofore used on automobiles of corresponding size and weight, has resulted in a considerable decrease in the diameter and an increase in the width of the demountable rims. The result of this change is that the rims now used for tires of the balloon type, are considerably stiffer and stronger than the rims heretofore used, for automobiles of corresponding size and weight. Coincident with the widespread adoption of balloon tires has been the use on many automobiles of four-wheel braking systems, necessitating the mounting of brakedrums on front as well as rear hubs. These changes have resulted in a marked increase in the unsprung weight on the front axle, which increase has been so noticeable, in some cases, as to require the redesign of the axle to strengthen it.

In connection with these changes, the old practice has heretofore been followed, however, in the design and manufacture of the wheels, and the wheels are heavier and more expensive than they need to be, and contribute unnecessarily to the unsprung weight on the front axle. The main object of my present invention is to provide an improved wheel construction, in which the weight of the wheel shall be kept as low as possible, and the total cost of the wheel, including the brakedrum, reduced considerably, without weakening it so that it will not adequately withstand the forces, such as load, sidethrust, and torque, imposed upon the structure. With that end in view, I propose to provide a construction in which the brakedrum constitutes the body of the wheel, and the tire-carrying rim is detachably connected to the brakedrum by means of relatively short spoke members, or lugs, rigidly secured to the rim and detachably connected to the brakedrum.

It is an object of my invention to provide a brakedrum having stiffening formations in the side wall thereof, which strengthen and reinforce the brakedrum adjacent the points where it is perforated, to receive the bolts by which the spoke members are detachably connected to the drum, whereby the brakedrum is reinforced so as to withstand adequately the stresses, such as load, sidethrust, and torque, which, in my wheel construction, are transmitted through the brakedrum. It is a further object of my invention to provide stiffening formations which also serve as seats for the inner ends of the spoke members, so as to form an interlocking connection between said spoke members and the brakedrum.

It is a further object of my invention to provide a wheel construction having relatively short spoke members rigidly secured to the rim and detachably connected to the brakedrum, of such construction that they can be manufactured very cheaply, add little to the weight, may be cheaply and quickly secured to the rim, and yet have ample strength to withstand the stresses exerted upon them, and to transmit such stresses from rim to brakedrum, or vice versa.

Further objects, and objects relating to details and economies of construction and operation, will definitely appear from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawings, forming a part of this specification, in which Figure 1 is a view in side elevation of a wheel embodying my invention;

In the drawings, the same reference numerals refer to the same parts throughout the several views.

Figure 1:
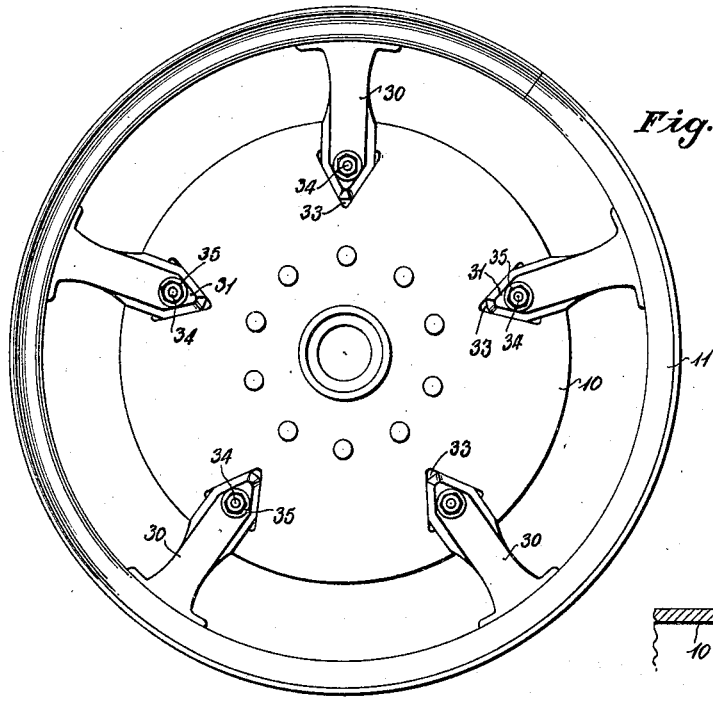
Figure 4:
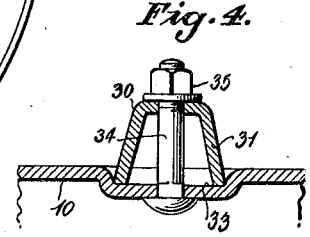
Fig. 4 is a transverse section taken on the line 4—4 of Fig. 2.
Figure 2:
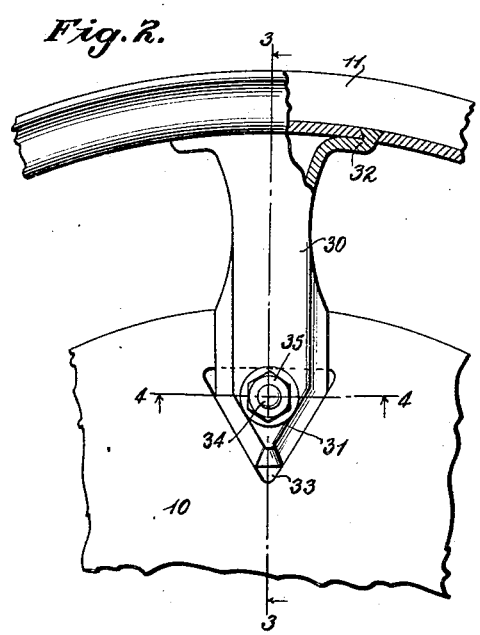
Fig. 2 is a fragmentary view in side elevation, and partly in section, showing a single spoke member and its connection with the rim and the brakedrum.
Figure 3:
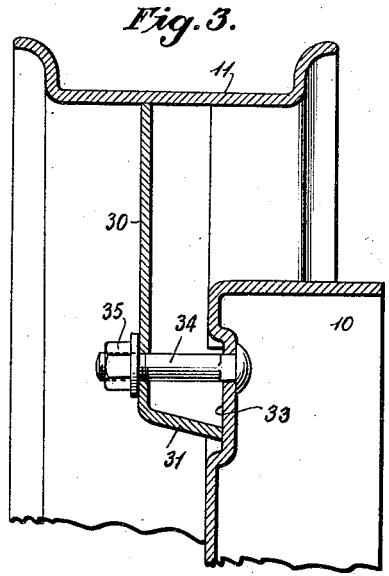
Fig. 3 is a vertical section taken on the line 3—3 of Fig. 2.

Referring to the numbered parts of the drawings, in which the preferred embodiments of my invention are illustrated, I have shown a brakedrum 10, connected to a hub in any suitable manner. This brakedrum has a plurality of substantially triangular depressions 33, formed in its side wall near the periphery thereof. A bolt hole is provided in each depression, through which a bolt 34 extends.

The tire-carrying rim is adapted to receive a pneumatic tire and provided with side flanges of usual construction which may be, as shown, of the straight side type, or, if desired, of the clincher type. Of course, the rim might be of the Q. D. type, in cases where that is deemed desirable. A plurality of relatively short spoke members 30 are rigidly secured to the base of the rim 11. Each of these spoke members is shown as a pressed metal channel-shaped member. The outer portion of said spoke member is extended along the inner face of the rim base, and provided with integral lugs 32, which extend through openings in the base of the rim and are riveted over, in order to rigidly connect the spoke member to the rim. The inner end portion 31 of the spoke member has the side walls of the channel inclined or converging, and these inclined side walls project laterally from the body of the spoke member and extend into the depression 33, where they engage and seat upon the converging side walls of said triangular depression. The bolt 34 extends through a bolt hole in the spoke member 30 and a nut 35, screwed on said bolt, clamps the inner portion of the spoke member against the side wall of the brakedrum with said converging side walls of the spoke member seated upon the converging side walls of the triangular depression 33.

The triangular depressions 33 serve to stiffen and reinforce the brakedrum at the points where it is perforated for the passage of the securing bolts 34, and thus reinforce the drum so that it is adequate to withstand the forces, such as load, sidethrust, and torque, which are transmitted through it. The inner ends of the spoke members seat upon and interlock with the side walls of these depressions and are clamped in such seating and interlocking engagement therewith. The rim is detachably connected with the brakedrum through these spoke members, but the detachable connections are such, due to this interlocking engagement, that the stresses may be safely transmitted through them.

Figure 5:
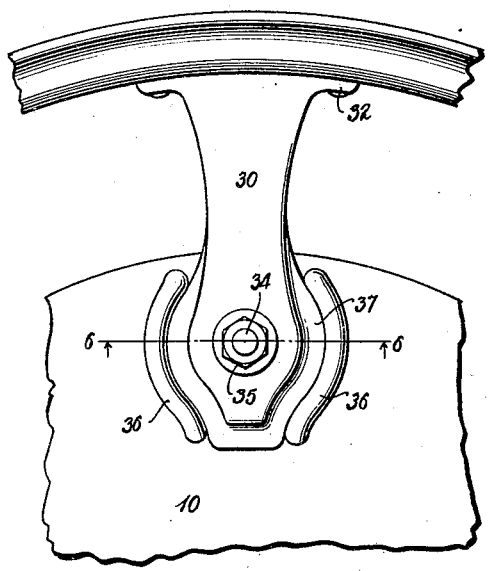
Fig. 5 is a view similar to Fig. 2, but showing a modified form of spoke member and stiffening formations in the drum.
Figure 6:
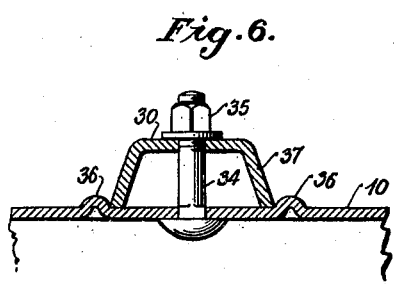
Fig. 6 is a transverse section on the line 6—6 of Fig. 5.

In Figs. 5 and 6, I have shown a modified construction in which, in place of the triangular depressions 33, oppositely curved ribs 36 are pressed in the side wall of the brakedrum, on opposite sides of the bolt hole through which the securing bolt 34 passes. These ribs serve to reinforce and stiffen the brakedrum at the points where it is perforated for the passage of the securing bolts. The pressed metal spoke member 30, of channel formation, has inclined side walls 37 with curved edges which seat upon the curved ribs 36 and interlock therewith. The nut 35 screwed on the bolt 34, passing through a bolt hole in the spoke member, engages the inner portion of the spoke member and clamps it with the curved edges of the side walls 37, in seating and interlocking engagement with the curved ribs 36. This construction also affords a very satisfactory interlocking connection between the spoke members and brakedrum, while the brakedrum is stiffened and reinforced by the curved ribs.

Figure 7:
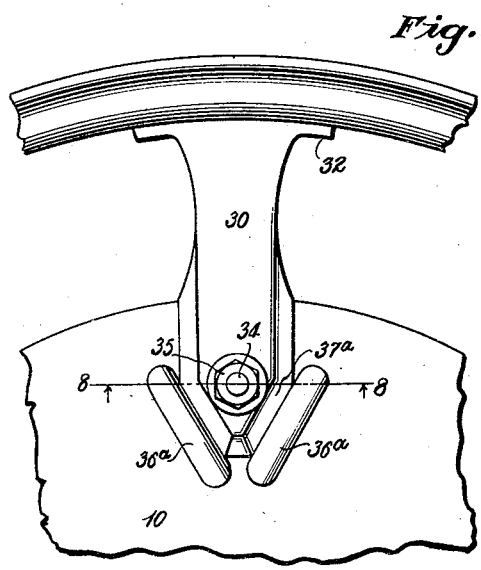
Fig. 7 is a view similar to Fig. 2, but showing another modified form of spoke member and stiffening formations in the drum.
Figure 8:
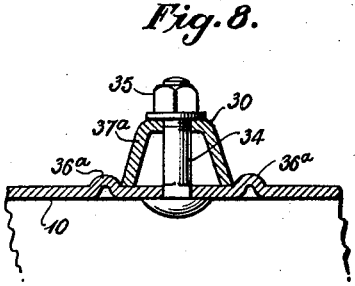
Fig. 8 is a transverse section taken on the line 8—8 of Fig. 7.

In Figs. 7 and 8, I have shown still another modified construction, in which a plurality of pairs of inclined or converging ribs $36^a$ are formed in the side wall of the brakedrum. The bolt holes through which the securing bolts 34 pass are located between the converging ribs, of the respective pairs of ribs, as shown in Figs. 7 and 8. These ribs serve to reinforce and strengthen the brakedrum at the points where it is weakened by the formation of the bolt holes. Each of the pressed metal spoke members 30, of channel formation, has, at its inner end, inclined side walls $37^a$ having converging edges which seat against and interlock with the converging ribs $36^a$. Securing bolt 34 passes through a bolt hole in the base of the channel spoke member, and the nut 35, screwed on the end of the bolt, engages the spoke member and clamps it to the brakedrum with said inclined side walls $37^a$ seating against and interlocking with the ribs $36^a$.

These inclined ribs stiffen and reinforce the brakedrum, and also co-operate with the inner end of the spoke member to form an interlocking connection through which the load and other forces may be adequately transmitted.

It will be observed that, in this wheel of my invention, the only weight in addition to that of the brakedrum and rim, is the weight of the relatively small and short spoke members attached to the rim, and the nuts and bolts by which these spokes are detachably connected to the brakedrum. The weight of these parts is much less than the weight of the usual spoke and felly constructions, used heretofore with the brakedrum, in wheels in which the load, sidethrust, and torque are transmitted from rim to hub, or vice versa, through the felly and spoke constructions, instead of being transmitted directly through the brakedrum, as in my improved wheel.

I am aware that this construction may be varied considerably without departing from the spirit of my invention, and, therefore, I claim my invention broadly, as set forth in the appended claims.

I claim:

1. A wheel comprising the combination of a brakedrum having a plurality of spoke seats pressed in the side wall thereof, a tire-carrying rim, a plurality of spoke members rigidly secured to said rim, the inner ends of said spoke members seating on said spoke seats, and means detachably connecting said spoke members to said brakedrum.

2. A wheel comprising the combination of a brakedrum having a plurality of spoke seats pressed in the side wall thereof, a tire-carrying rim, a plurality of spoke members rigidly secured to said rim, the inner ends of said spoke members seating on said spoke seats, bolts extending through the side wall of the brakedrum in proximity to said spoke seats, and nuts screwed on said bolts and engaging said spoke members to clamp the same in seating engagement in said spoke seats.

3. A wheel comprising the combination of a brakedrum having a plurality of spoke seats pressed in the side wall thereof, a tire-carrying rim, a plurality of spoke members rigidly secured to said rim and each having a pair of side walls at its inner end seating on said spoke seats, and means detachably connecting said spoke members to said brakedrum.

4. A wheel comprising the combination of a brakedrum having a plurality of spoke-seating depressions formed in the side wall thereof, a tire-carrying rim, a plurality of spoke members rigidly secured to said rim, bolts carried by the side wall of said brakedrum and each extending through one of said depressions and the inner end of a spoke member, and nuts screwed on said bolts and engaging the spoke members.

5. A wheel comprising the combination of a brakedrum having a plurality of substantially triangular spoke-seating depressions formed in the side wall thereof, a tire-carrying rim, a plurality of spoke members rigidly secured to said rim and each having a pair of converging side walls at its inner end engaging the side walls of a depression, and means for detachably clamping the inner ends of said spoke members in seating engagement in said depressions.

JAMES H. WAGENHORST.